US008746900B2

(12) United States Patent
Yamaguchi et al.

(10) Patent No.: US 8,746,900 B2
(45) Date of Patent: Jun. 10, 2014

(54) LENS COVER MECHANISM FOR PROJECTOR (75) Inventors: Toshiyuki Yamaguchi, Tokyo (JP); Akio Morita, Tokyo (JP); Yasushi Itou, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 0 days.

(21) Appl. No.: 13/580,636

(22) PCT Filed: Feb. 25, 2010

(86) PCT No.: PCT/JP2010/052960
§ 371 (c)(1),
(2), (4) Date: Aug. 22, 2012

(87) PCT Pub. No.: WO2011/104842
PCT Pub. Date: Sep. 1, 2011

(65) Prior Publication Data
US 2012/0327513 A1   Dec. 27, 2012

(51) Int. Cl.
*G02B 23/16* (2006.01)
*G03B 21/14* (2006.01)
(52) U.S. Cl.
USPC .............................. 359/511; 353/92
(58) Field of Classification Search
USPC ............................... 353/92; 359/511
See application file for complete search history.

(56) References Cited

U.S. PATENT DOCUMENTS

| 2006/0268232 | A1* | 11/2006 | Jin ................................ 352/204 |
| 2007/0081820 | A1 | 4/2007 | Izumi et al. |
| 2009/0034045 | A1* | 2/2009 | Zhou et al. .................... 359/227 |

FOREIGN PATENT DOCUMENTS

| JP | 57-124181 | | 8/1982 |
| JP | 61-107226 | A | 5/1986 |
| JP | 2-044729 | | 3/1990 |
| JP | 07-333687 | A | 12/1995 |
| JP | 10-153811 | A | 6/1998 |
| JP | 2001-208407 | A | 8/2001 |
| JP | 2007-108338 | A | 4/2007 |
| JP | 2008-102376 | A | 5/2008 |

OTHER PUBLICATIONS

International Search Report in PCT/JP2010/052960 dated Apr. 27, 2010 (English Translation Thereof).

* cited by examiner

*Primary Examiner* — Jade R Chwasz
(74) *Attorney, Agent, or Firm* — McGinn IP Law Group, PLLC (57) ABSTRACT The present invention provides a sliding lens cover mechanism for a projector, which enables enhancement in operability and prevention of noise, and the sliding lens cover mechanism includes: a front panel that allows the projection lens to be exposed from a part thereof; a lens cover that moves over said front panel, from fully-open state in which the projection lens is exposed and a fully-closed state in which said lens cover covers the projection lens; and a slide device unit that biases the lens cover to move to a fully-open state or to a fully-closed state or to an intermediate state, wherein the lens cover includes a pin that protrudes toward the front panel; and wherein the front panel includes a slide plate that abuts against the pin only in the fully open state or in the fully closed state.

11 Claims, 13 Drawing Sheets

LENS COVER MECHANISM FOR PROJECTOR

TECHNICAL FIELD

The present invention relates to a projector that projects image light via a projection lens, and specifically relates to a lens cover mechanism for protecting the projection lens.

BACKGROUND ART

For liquid-crystal projectors and projectors that generate image light using a DMD (digital micromirror device) and project the image light via a projection lens, lens covers that cover a projection lens are used in order to protect the projection lens when no projection is performed.

Examples of the lens covers include those having the shape of a cap, which are attached to the projection lens, and sliding-type ones in which a part of a chassis of the projector slides and covers the projection lens.

Although those that have the shape of a cap may be lost, the sliding covers will not be lost because they are integrated with the chasses of the projectors.

Examples of the sliding covers include one disclosed in Patent Literature 1 (JP2-44729U) and Patent Literature 2 (JP2008-102376A).

The one disclosed in Patent Literature 1 is a lens cover that is only manually slidable.

A lens cover that is only manually slidable, like the one in Patent Literature 1, may stop between a fully-open state and a fully-closed state, and thus, an operator needs to operate the lens cover in such a way that it is moved to the fully open state or to the fully closed state, because of lens cover may stop in the intermediate state, and such operation is troublesome.

The lens cover disclosed in Patent Literature 2 has been made in view of the problem arising in the above technique disclosed in Patent Literature 1, and is provided with a biasing means for biasing a lens cover to move to a full open state or to a fully closed date.

CITATION LIST

Patent Literature

Patent Literature 1: P2-44729U
Patent Literature 2: P2008-102376A

SUMMARY OF INVENTION

Technical Problem

A troublesome operation is required to operate the lens cover described in Patent Literature 1. The one described in Patent Literature 2 provides improvement in operability because of the provision of the biasing means.

More and more projectors use a brighter light source to increase brightness. A common cooling mechanism in the light source is a fan, which requires a large amount of airflow, and which causes a large amount of vibration.

In addition to business applications, such as briefings in meetings, projectors are used, for example, for video watching in general households. In any case, noise generation is not desirable. As described above, projectors include a vibration source, and each of the components included in a projector requires a structure that prevents noise from being generated according to vibration.

Operating the lens cover described in Patent Literature 1 is troublesome and improvement in the operability of the lens cover described in Patent Literature 2 is achieved by providing biasing means; however, no specific description is provided in terms of indicating a structure that can prevent the generation of noise.

The present invention is intended to provide a sliding lens cover mechanism for a projector, which enables enhancement in operability and prevention of noise generation.

Solution to Problem

A lens cover mechanism for a projector according to the present invention includes a lens cover mechanism for covering a projection lens of a projector, a lens cover mechanism for covering the projection lens of a projector, the lens cover mechanism including:

a front panel that allows the projection lens to be exposed from a part thereof;

a lens cover that moves over the front panel between a fully-open state in which the projection lens is exposed and a fully-closed state in which the lens cover covers the projection lens; and A slide device unit that biases the lens cover to move to a fully-open state or to a fully-closed state, wherein the lens cover includes a pin that protrudes toward the front panel; and wherein the front panel includes a slide plate that abuts against the pin only in the fully-open state or in the fully-closed state.

Advantageous Effects of Invention

In the present invention, a lens cover for a projector has a smooth sliding operation, and there is no negative reaction when the lens cover is in a fully open or a fully closed state, whereby noise generation is prevented.

DESCRIPTION OF EMBODIMENT

Next, an exemplary embodiment will be described with reference to the drawings.

Figure 1:
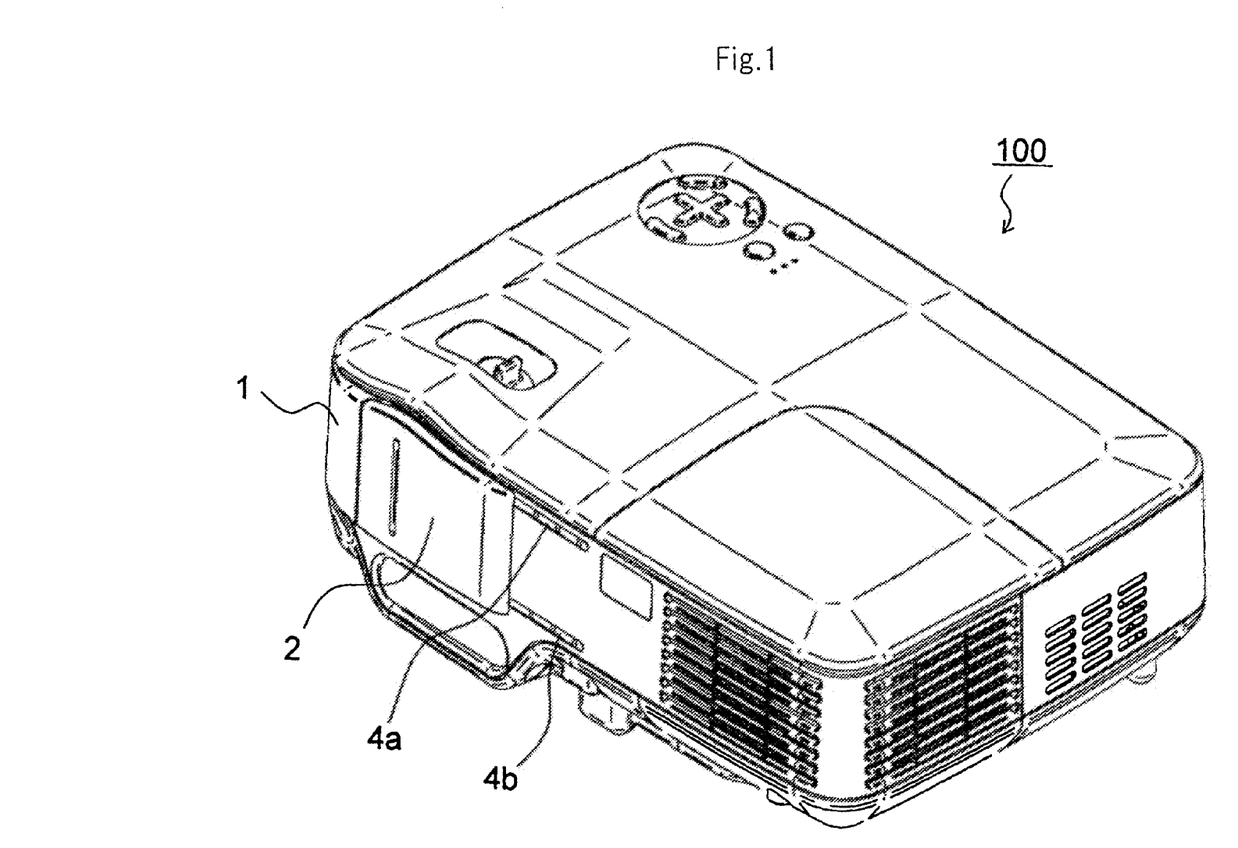
FIG. 1 is a perspective diagram illustrating a configuration of an exemplary embodiment of a projector including a lens cover mechanism according to the present invention.
Figure 3:
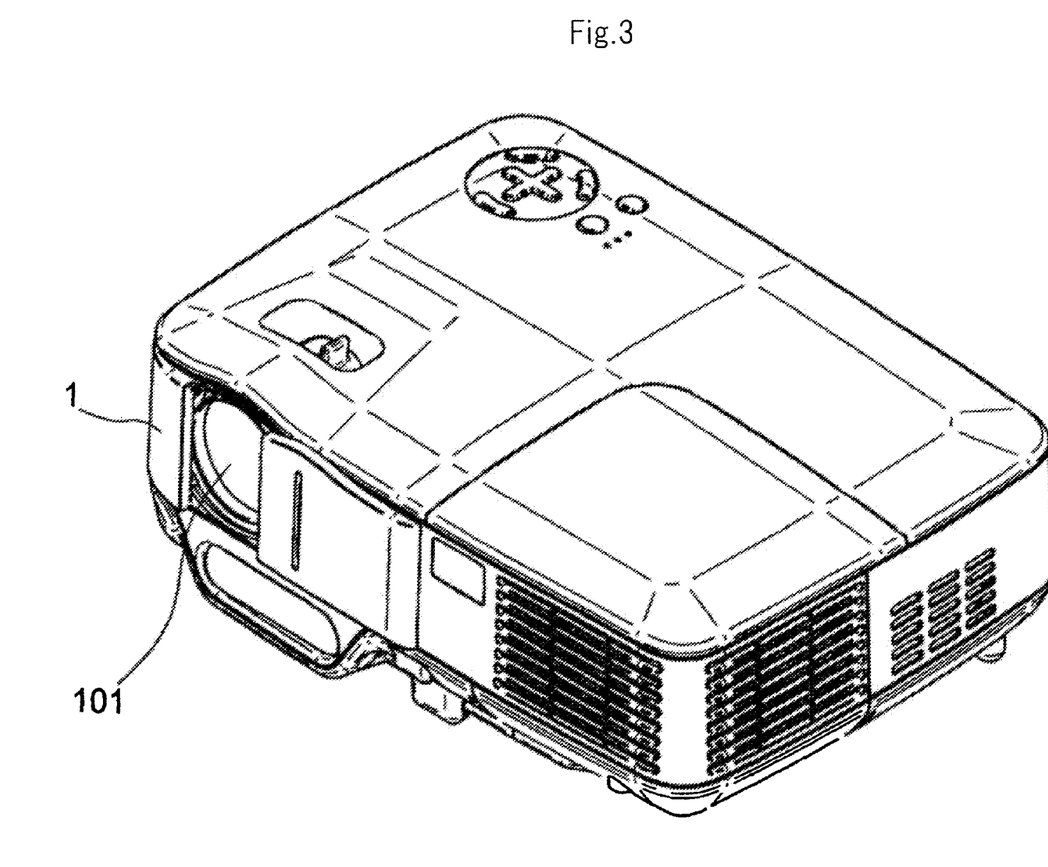
FIG. 3 is a perspective diagram illustrating a configuration of an exemplary embodiment of a projector including a lens cover mechanism according to the present invention.

FIGS. 1 and 3 are perspective diagrams each illustrating an exemplary embodiment of projector 100 including a lens cover mechanism according to the present invention. FIG. 3 illustrates a state in which lens cover 2 is open when, e.g., image light is projected from projection lens 101, and FIG. 1 illustrates a state in which projection lens 101 is covered by lens cover 2.

As illustrated in FIG. 3, projection lens 101 is exposed from a part of front panel 1 of projector 100, and lens cover 2 for covering projection lens 101 is attached to front panel 1. As illustrated in the front views in FIGS. 2 and 4, lens cover 2 moves in the horizontal direction in FIGS. 2 and 4.

Figure 2:
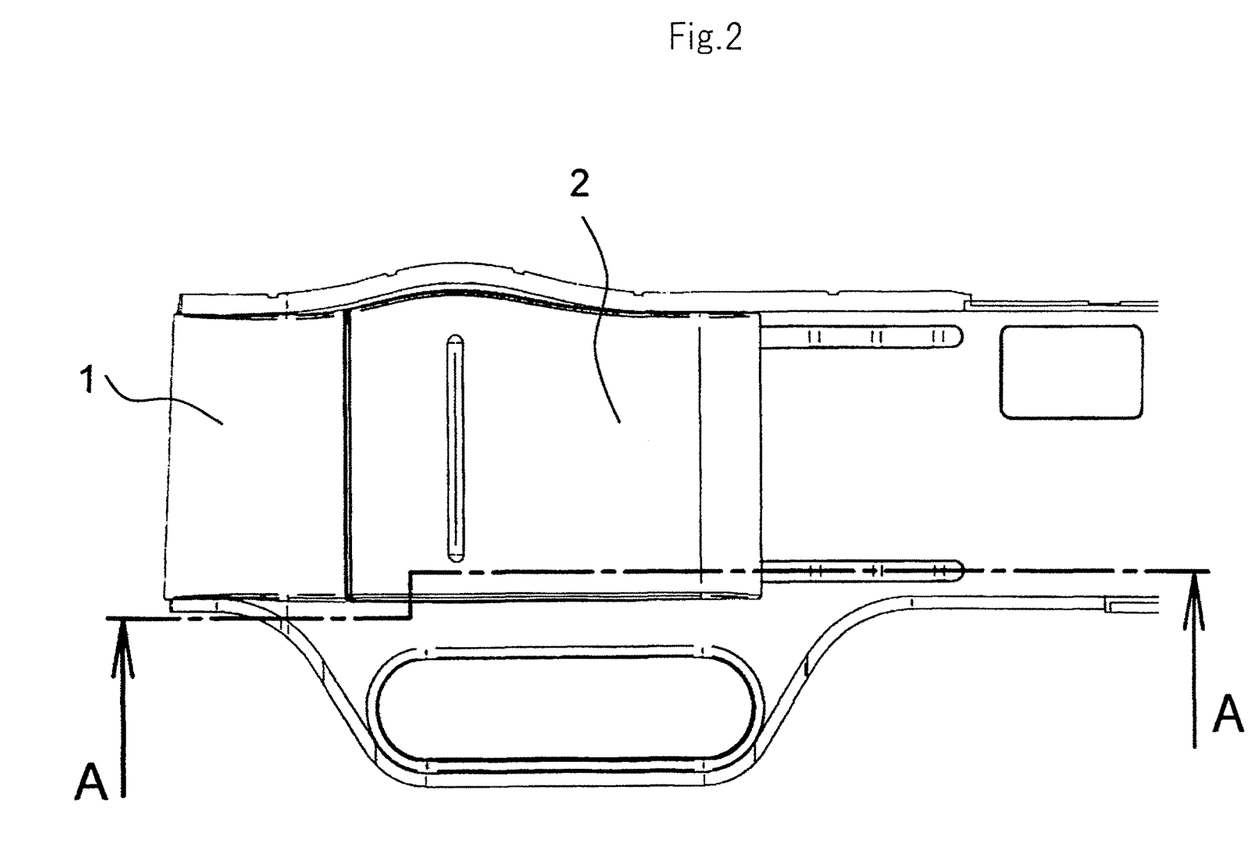
FIG. 2 is a front view of a state in which lens cover 2 is closed in FIG. 1.
Figure 4:
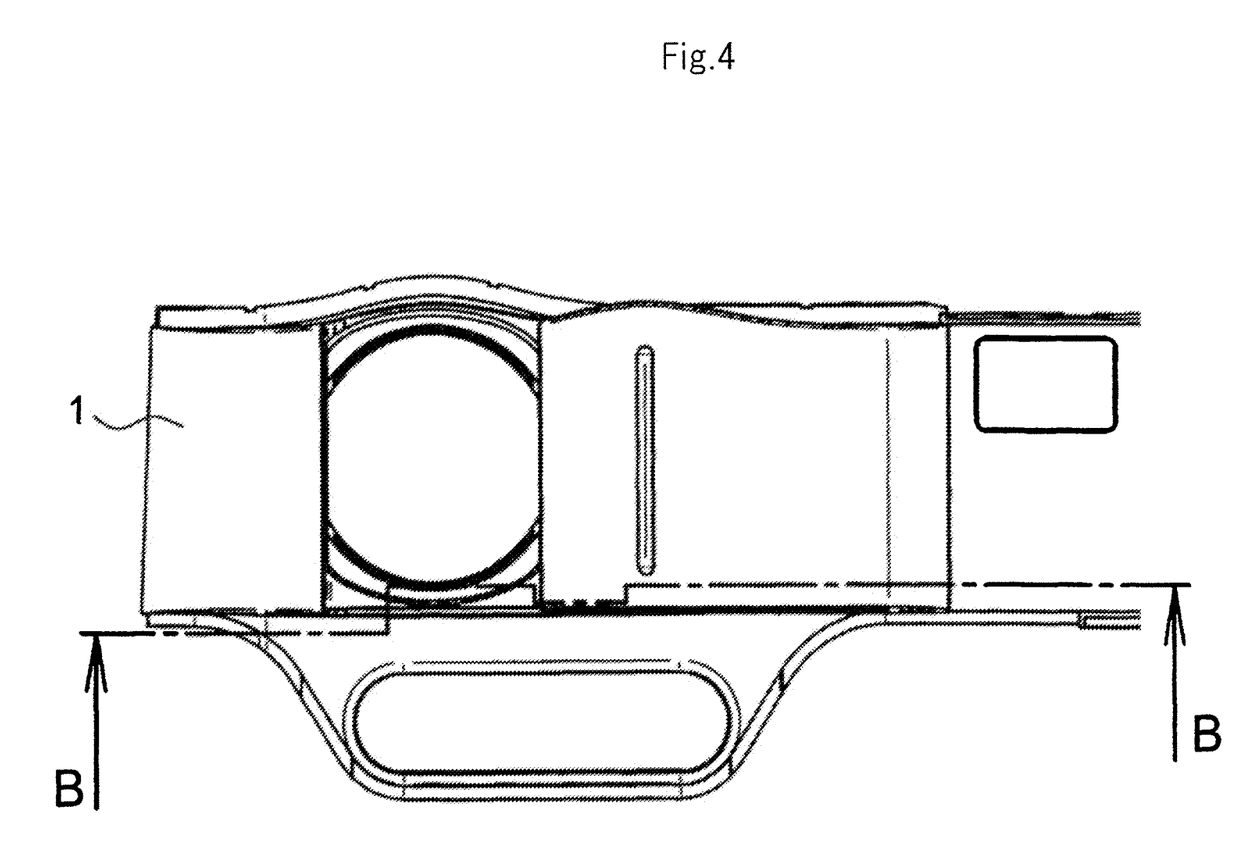
FIG. 4 is a front view of a state in which lens cover 2 is open in FIG. 1.

FIG. 2 illustrates a state in which lens cover 2 has moved to the leftmost position in FIG. 2 whereby projection lens 101 is covered by lens cover 2, and FIG. 4 illustrates a state in which lens cover 2 has moved to the rightmost position in FIG. 4 whereby lens cover 2 is open when, e.g., image light is projected from projection lens 101.

Figure 7:
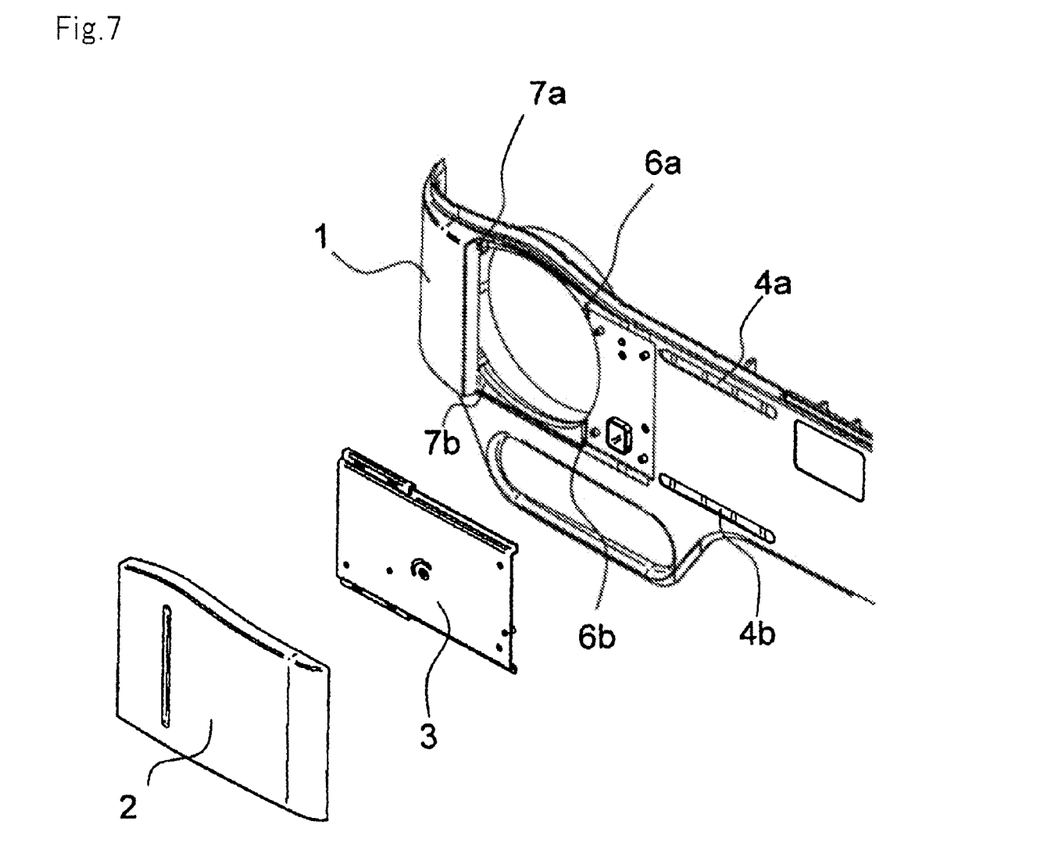
FIG. 7 is an exploded perspective diagram illustrating the configuration of the exemplary embodiment illustrated in FIG. 1 in more detail.
Figure 8:
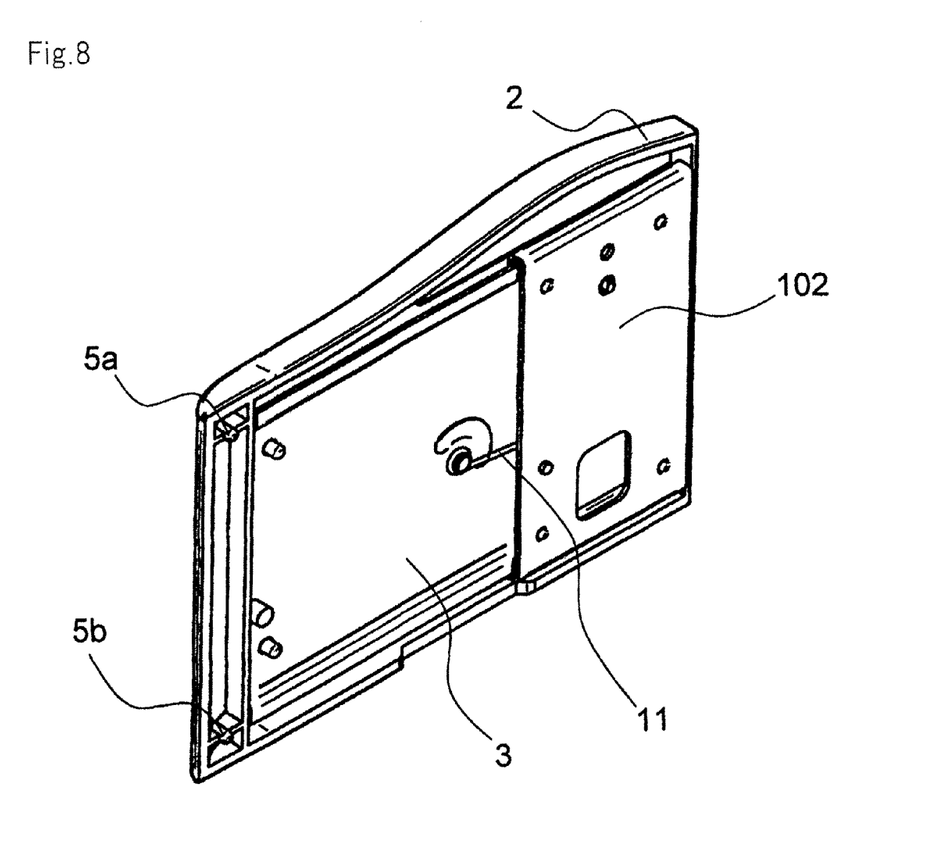
FIG. 8 is a perspective view of lens cover 2 and slide mechanism unit 3, which have been assembled together, on the front panel 1 side.
Figure 9:
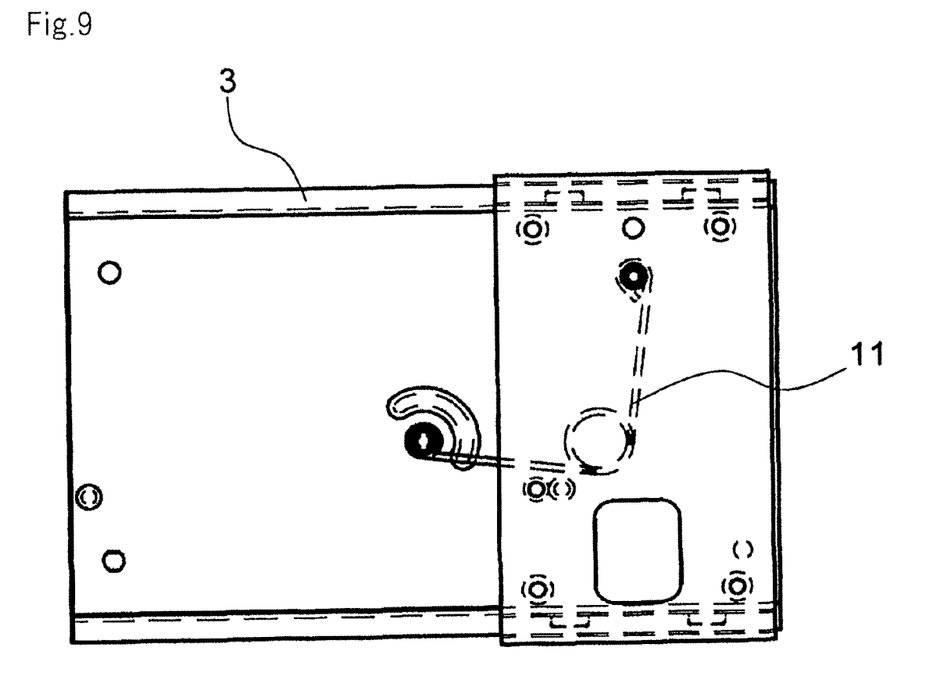
FIG. 9 is a perspective view of lens cover 2 and slide mechanism unit 3, which have been assembled together, on the front panel 1 side.

FIG. 7 is an exploded perspective diagram illustrating the configuration of the present exemplary embodiment in more detail. FIGS. 8 and 9 are a perspective view and a plan view of lens cover 2 and slide mechanism unit 3 respectively, which have been assembled together, on the front panel 1 side.

Attachment panel 102 is secured to front panel 1 via screws (not illustrated). Meanwhile, slide mechanism unit 3 is movably assembled with attachment panel 102 via torsion spring 11. Lens cover 2 is integrated with slide mechanism unit 3 by means of a double-sided adhesive tape and thermal welding (not illustrated). In other words, lens cover 2 and slide mechanism unit 3 slide over front panel 1.

FIG. 9 illustrates a state in which lens cover 2 is open and image light is projected from projection lens 101, and which is the same as the state illustrated in FIG. 4. In the state illustrated in FIG. 9, slide mechanism unit 3 is biased by torsion spring 11 to the left in the Figure, whereby the fully-open state of lens cover 2 is maintained.

When lens cover 2 is closed, lens cover 2 is moved to the right in the Figure by means of a user's operation. In this movement of lens cover 2, first, torsion spring 11 exerts a spring force in the direction in which lens cover 2 has been closed because torsion spring 11 has become compressed, but when the intermediate point, where torsion spring 11 is compressed the most, has been reached, torsion spring 11 starts to unfurl, and as a result, torsion spring 11 exerts a spring force in the direction in which lens cover 2 is opened.

As illustrated in FIG. 8, pins 5a and 5b protruding toward front panel 1 are provided at one end of lens cover 2 (right end viewed from the front side when lens cover 2 is attached to front panel 1). In the fully-open state illustrated in, e.g., FIG. 1, pins 5a and 5b that are provided in lens cover 2 abut against slide plates 4a and 4b.

Figure 10:
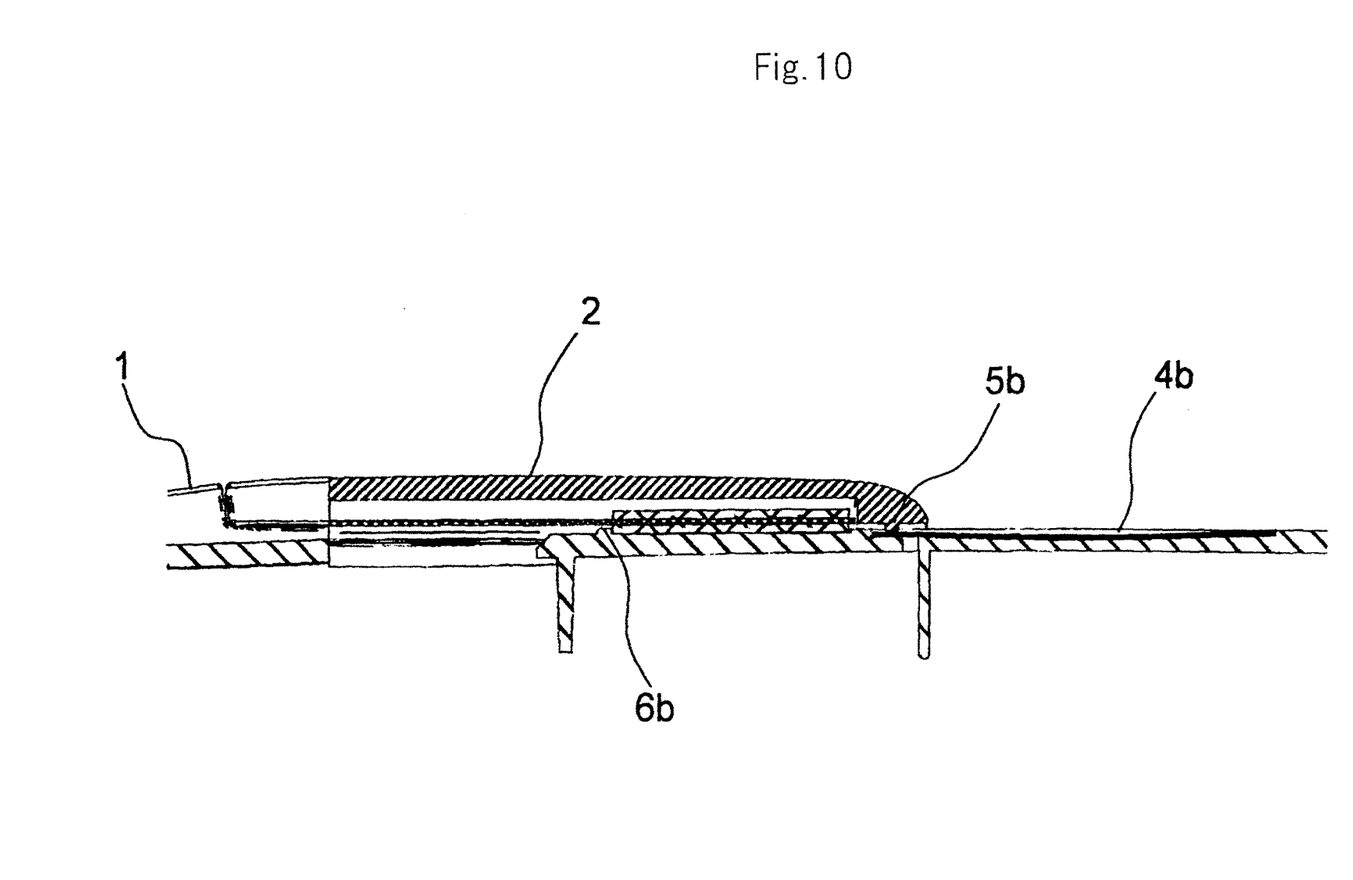
FIG. 10 is a cross-sectional view along double arrow-headed line A-A in FIG. 2.

FIG. 10 is a cross-sectional view along double arrow-headed line A-A in FIG. 2. As illustrated in FIGS. 7 and 10, protrusions 6a and 6b protruding toward lens cover 2 are provided in front panel 1. As illustrated in FIG. 10, in a state in which lens cover 2 is fully closed, protrusions 6a and 6b of front panel 1 are not in contact with lens cover 2.

Figure 11:
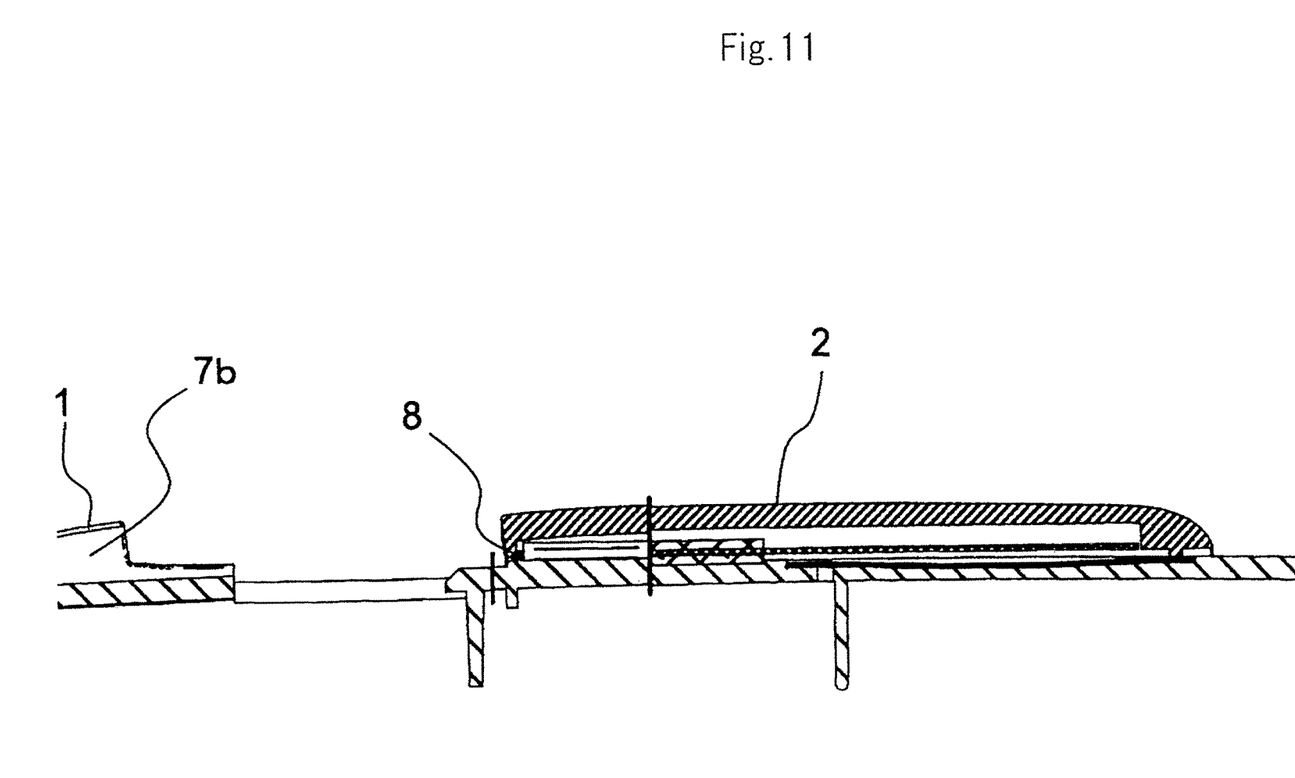
FIG. 11 is a cross-sectional view along double arrow-headed line B-B in FIG. 4.

FIG. 11 is a cross-sectional view along double arrow-headed line B-B in FIG. 4. As illustrated in FIG. 11, at another end of lens cover 2 (left end viewed from the front side when lens cover 2 is attached to front panel 1), rib 8 is formed as a result of the other end being flexed toward front panel 1. Guide portions 7a and 7b (see FIG. 7) each having a shape that fits rib 8 are provided in front panel 1. When lens cover 2 is in a fully-closed state, rib 8 of lens cover 2 abuts against guide portions 7a and 7b of front panel 1.

Figure 5:
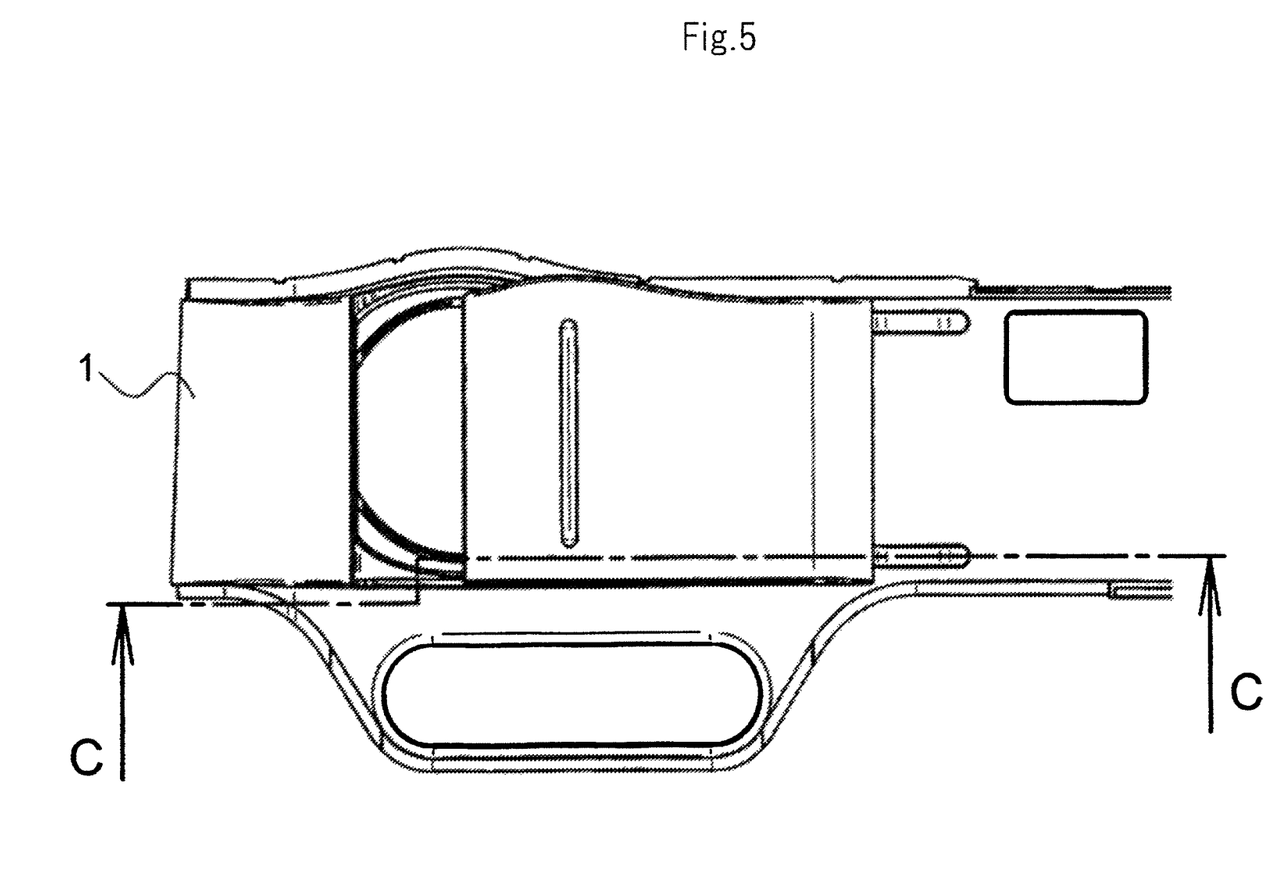
FIG. 5 is a front view of a state in which a lens cover is in an intermediate state.
Figure 6:
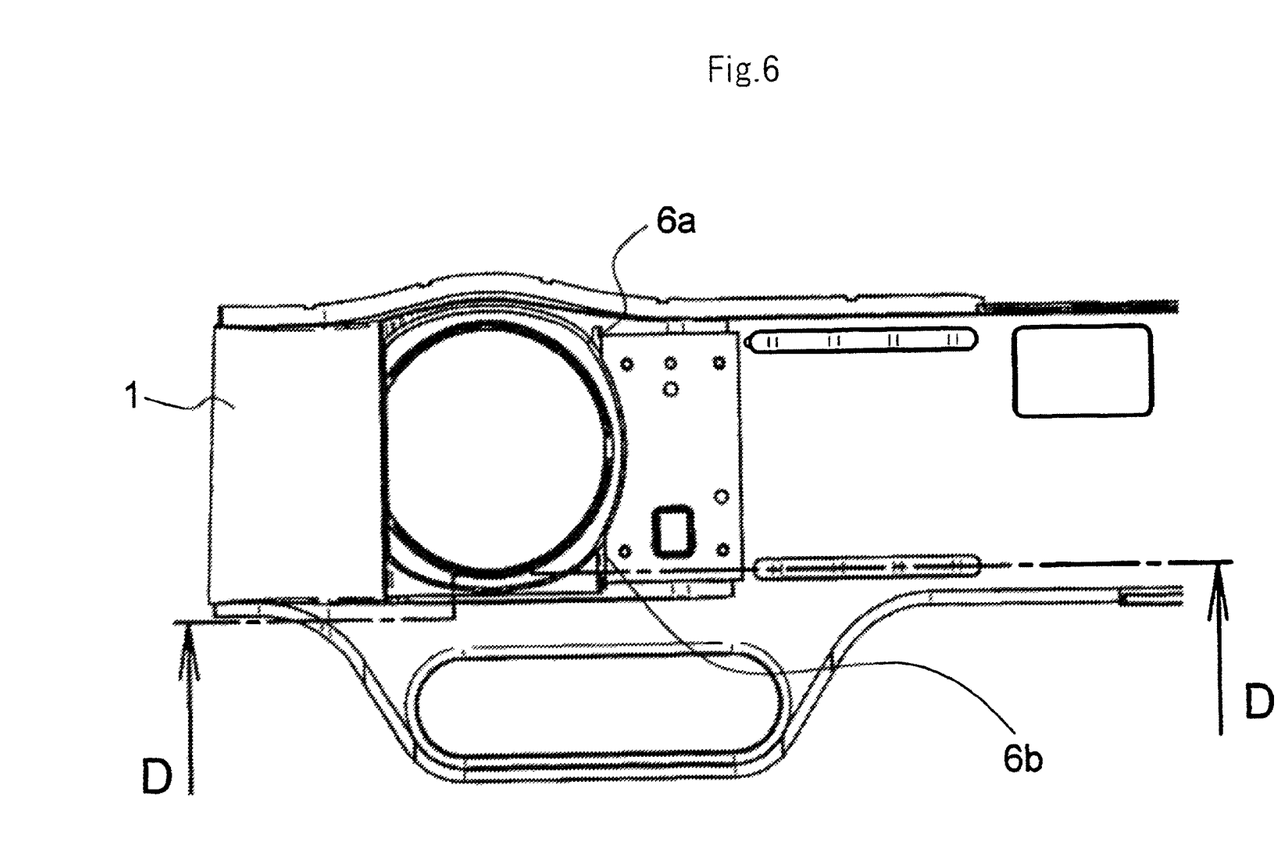
FIG. 6 is a front view of front panel 1 in FIG. 1.
Figure 12:
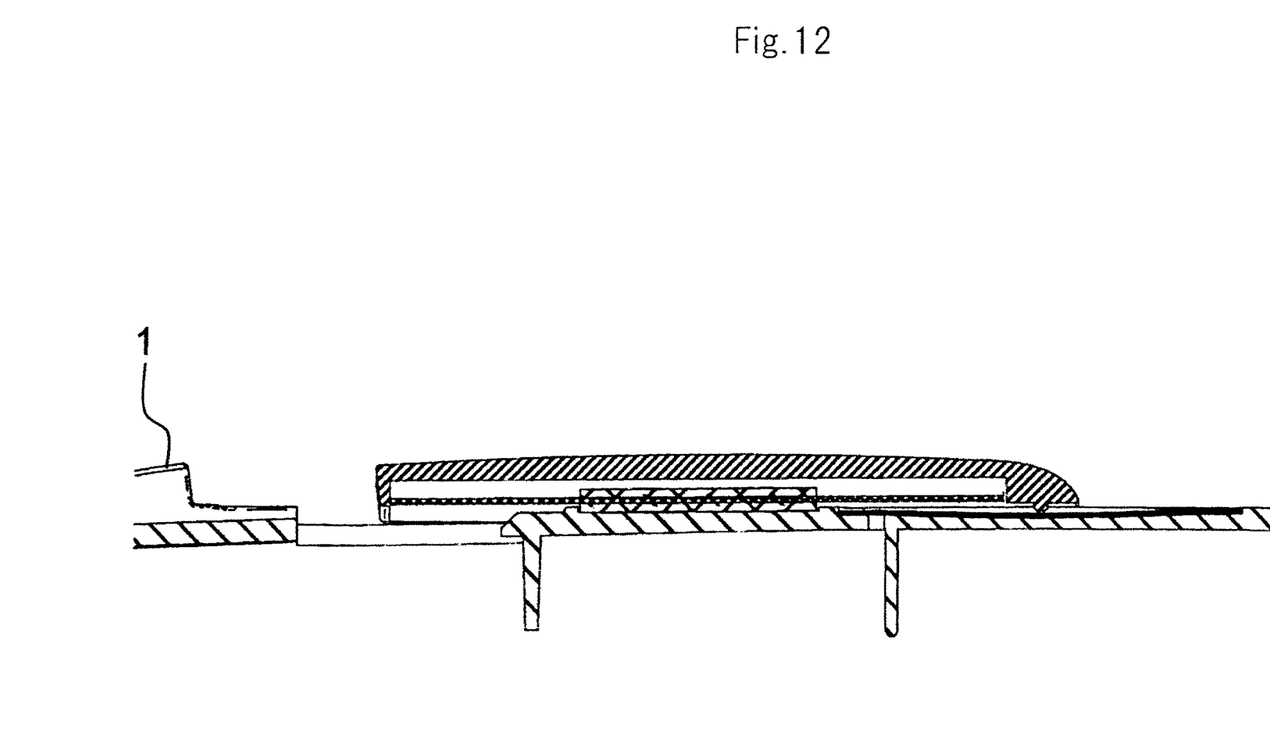
FIG. 12 is a cross-sectional view along double arrow-headed line C-C in FIG. 5.
Figure 13:
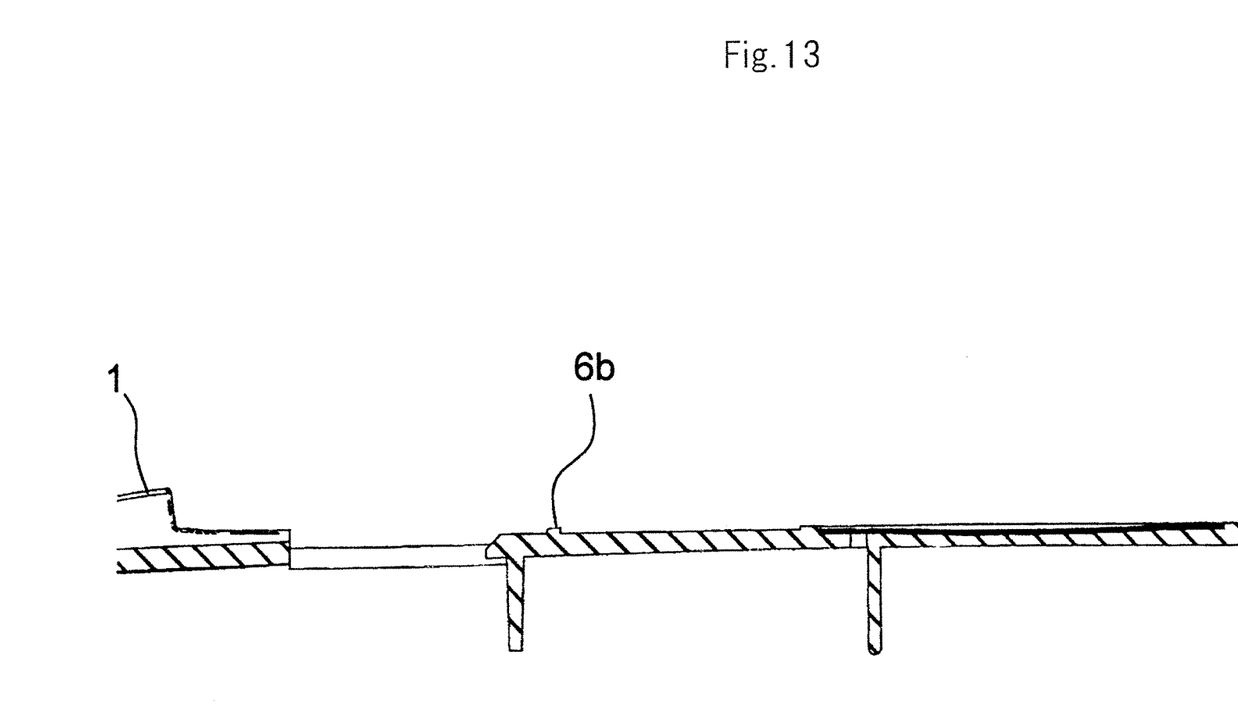
FIG. 13 is a cross-sectional view along double arrow-headed line D-D in FIG. 6.

FIG. 5 is a front view of lens cover 2 at a certain point of time during an opening/closing operation, FIG. 6 is a front view of front panel 1, FIG. 12 is a cross-sectional view along double headed-arrow line C-C in FIG. 5, and FIG. 13 is a cross-sectional view along double headed-arrow line D-D in FIG. 6.

An opening/closing operation of lens cover 2 according to the present exemplary embodiment, which is configured as described above, will be described in detail with reference to FIGS. 5, 6, 12 and 13 in addition to the aforementioned Figures.

As illustrated in FIGS. 5 and 12, when lens cover 2 is manually made to slide to the left away from a state in which lens cover 2 is fully open, lens cover 2, when it has reached a part way position, is slid to a fully closed state by torsion spring 11.

When lens cover 2 is made to move, as described above, if front panel 1 and lens cover 2 are in contact with each other, a friction force is generated, and if the friction force is larger than the spring force of torsion spring 11, lens cover 2 is not moved to a fully closed state.

In the present exemplary embodiment, front panel 1 and lens cover 2 are not in contact with each other in the intermediate state, and thus, lens cover 2 is moved to a fully-closed state.

In the present exemplary embodiment, front panel 1 and lens cover 2 are configured so as to be in contact with each other only in a fully-open state and a fully-closed state.

Pins 5a and 5b are provided at one end of lens cover 2, and rib 8 is provided at another end of lens cover 2. Furthermore, slide plates 4a and 4b, protrusions 6a and 6b and guide portions 7a and 7b are provided in front panel 1.

Slide plates 4a and 4b extend along a direction in which lens cover 2 slides, and abut against pins 5a and 5b only when lens cover 2 is in a fully-open state and only when lens cover 2 is in a fully-closed state. Guide portions 7a and 7b abut against rib 8 only when lens cover 2 is in a fully-closed state. Protrusions 6a and 6b abut against rib 8 only when lens cover 2 is in a fully-open state.

In order to cause slide plates 4a and 4b to be in contact with pins 5a and 5b of lens cover 2 only when lens cover 2 is in an fully-open state and only when lens cover 2 is in a fully-closed state, and to cause slide plates 4a and 4b not to be in contact with pins 5a and 5b in an intermediate state, slide plates 4a and 4b each have a recessed shape that protrudes closest to lens cover 2 at respective positions corresponding to pins 5a and 5b when lens cover 2 is in an fully-open state and away from the lens covers between these states.

Furthermore, guide portions 7a and 7b each have a shape, only a left end portion of which protrudes toward lens cover 2 so that guide portions 7a and 7b are in contact with rib 8 of lens cover 2 in a fully-closed state and are not in contact with rib 8 before lens cover 2 enters the fully-closed state.

In the present exemplary embodiment configured as described above, in the state illustrated in FIGS. 3, 4 and 11 in which lens cover 2 is fully open, pins 5a and 5b that are provided at the back surface of lens cover 2 abut against slide plates 4a and 4b, and rib 8 of lens cover 2 abuts against protrusions 6a and 6b of the front panel.

In the state illustrated in FIGS. 1, 2 and 10 in which lens cover 2 is fully closed, pins 5a and 5b provided at the back surface of lens cover 2 abut against slide plates 4a and 4b, and rib 8 of lens cover 2 abuts against guide portions 7a and 7b of the front panel.

In the present exemplary embodiment, front panel 1 and lens cover 2 are in contact with each other at four positions in each fully-open state and each fully-closed state of lens cover 2. Accordingly, there is no negative reaction, and thus, no noise is generated. Furthermore, no depth difference occurs between front panel 1 and lens cover 2.

Furthermore, slide plates 4a and 4b each have a recessed shape that protrudes closest to lens cover 2 at two positions, i.e., a position corresponding to respective pin 5a or 5b when lens cover 2 is in a fully-open state, and a position corresponding to respective pin 5a or 5b when lens cover 2 is in a fully-closed state and when plates 4a and 4b are not close to lens cover 2 when lens cover 2 is in an intermediate state. Thus, in an intermediate state such as illustrated in FIGS. 5 and FIG. 12, slide plate 4a and pin 5a, slide plate 4b and pin 5b, protrusion 6a and rib 8, protrusion 6b and rib 8, guide portion 7a and rib 8, and guide portion 7b and rib 8 are not in contact with each other, and lens cover 2 slides smoothly.

REFERENCE SIGNS LIST 1 front panel
2 lens cover
3 slide mechanism unit
4a slide plate
4b slide plate
5a pin
5b pin
6a protrusion
6b protrusion
7a guide portion
7b guide portion
8 rib
11 torsion spring
100 projector
101 projection lens

The invention claimed is:

1. A projector, comprising:
a projection lens;
a front panel, said front panel comprising:
an opening part configured to allow the projection lens to be exposed from the opening part; and
a slide plate unit;
a lens cover that moves over said front panel, from a fully-open state in which the projection lens is exposed to a fully closed state in which said lens cover covers the projection lens;
a slide mechanism unit configured to bias the lens cover to move to the fully-open state or to the fully-closed state; and
a first pin part located at one extremity of said lens cover, said first pin part protruding towards said front panel,
wherein said slide plate unit is in contact with said first pin part in the fully-open state or in the fully-closed state; and further comprising:
a second pin part located at an other extremity of said lens cover, said second pin part protruding towards said front panel,
wherein said front panel further comprises:
a protrusion portion which is arranged between said slide plate unit and said opening part; and
a guide portion,
wherein said protrusion portion is in contact with said second pin part in the fully-open state, and
wherein said guide portion is in contact with said second pin part in the fully-closed state.

2. The projector according to claim 1, wherein a distance between said slide plate unit and said first pin part is closest in both the fully-open state and the fully-closed state.

3. The projector according to claim 1, wherein said opening part is located between said protrusion portion and said guide portion.

4. A projector, comprising:
a projection lens;
a front panel, said front panel comprising:
an opening part configured to allow the projection lens to be exposed from the opening part; and
a slide plate unit;
a lens cover that moves over said front panel, from a fully-open state in which the projection lens is exposed to a fully closed state in which said lens cover covers the projection lens;
a slide mechanism unit configured to bias the lens cover to move to the fully-open state or to the fully-closed state; and
a first pin part located at one extremity of said lens cover, said first pin part protruding towards said front panel,
wherein said slide plate unit is in contact with said first pin part in the fully-open state or in the fully-closed state; and further comprising:
an attachment panel which is secured to said front panel,
wherein said attachment panel is associated with said slide mechanism unit via a torsion spring.

5. A lens cover apparatus, comprising:
a front panel, said front panel comprising a first slide plate and a second slide plate formed thereon;
a cover, said cover comprising a first pin and a second pin, the first pin and the second pin being configured to be received in the first slide plate and the second slide plate, respectively, said cover being configured to slide over the front panel from an open position to a closed position; and
a sliding device configured to bias the cover towards the open position or the closed position from an intermediate position,
wherein the first slide plate and the second slide plate are each configured to abut against the first pin and the second pins in either the open position or the closed position,
wherein said sliding device comprises a torsion spring, and
wherein said torsion spring is in a maximum compression point at approximately the intermediate position.

6. The lens cover apparatus according to claim 5, wherein the first pin and the second pin are each provided in opposing ends of a first end of the cover.

7. The lens cover apparatus according to claim 5, wherein said cover further comprises ribs, said ribs being provided facing the front panel.

8. The lens cover apparatus according to claim 7, wherein said front panel further comprises protrusions that protrude towards said cover, and
wherein, in the open position, the protrusions abut against the ribs.

9. The lens cover apparatus according to claim 7, wherein said front panel further comprises guide portions that protrude towards said cover, and wherein, in the closed position, the guide portions abut against the ribs.

10. The lens cover apparatus according to claim 5, wherein the cover and the front panel are in contact in both the open position and the closed position.

11. The lens cover apparatus according to claim 5, wherein said slide portions extend in a sliding direction of the cover.

* * * * *